(12) United States Patent  
Aizenberg et al.

(10) Patent No.: US 7,998,431 B2
(45) Date of Patent: *Aug. 16, 2011

(54) ENVIRONMENTALLY SENSITIVE NANOSTRUCTURED SURFACES

(75) Inventors: Joanna Aizenberg, New Providence, NJ (US); Paul Robert Kolodner, Hoboken, NJ (US); Thomas Nikita Krupenkin, Warren, NJ (US); Oleksandr Sydorenko, Painted Post, NY (US); Joseph Ashley Taylor, Springfield, NJ (US)

(73) Assignee: Alcatel Lucent, Paris (FR)

( * ) Notice: Subject to any disclaimer, the term of this patent is extended or adjusted under 35 U.S.C. 154(b) by 1098 days.

This patent is subject to a terminal disclaimer.

(21) Appl. No.: 11/279,220

(22) Filed: Apr. 10, 2006

(65) Prior Publication Data

US 2007/0237937 A1 Oct. 11, 2007

(51) Int. Cl.
 *G01N 25/00* (2006.01)
 *G01N 27/00* (2006.01)
(52) U.S. Cl. ........ 422/400; 524/916; 977/701; 977/724; 977/725; 977/902; 977/961; 977/962; 977/963
(58) Field of Classification Search ............... 422/55; 524/916; 977/700, 701, 724, 725, 902, 961, 977/962, 963
See application file for complete search history.

(56) References Cited

U.S. PATENT DOCUMENTS

| | | | |
|---|---|---|---|
| 5,114,676 A * | 5/1992 | Leiner et al. ............... | 422/82.06 |
| 5,350,966 A | 9/1994 | Culp | |
| 5,501,893 A | 3/1996 | Laemer et al. | |
| 6,066,911 A | 5/2000 | Lindemann et al. | |
| 6,222,303 B1 | 4/2001 | Nakamura et al. | |
| 6,720,712 B2 | 4/2004 | Scott et al. | |
| 6,864,620 B2 | 3/2005 | Takeuchi et al. | |
| 7,061,161 B2 | 6/2006 | Scher et al. | |
| 7,075,213 B2 | 7/2006 | Krill | |
| 2003/0098632 A1 | 5/2003 | Takeuchi et al. | |
| 2004/0173506 A1* | 9/2004 | Doktycz et al. ................ | 422/63 |
| 2004/0191127 A1 | 9/2004 | Kornblit et al. | |
| 2004/0201324 A1 | 10/2004 | Takeuchi et al. | |
| 2005/0039661 A1 | 2/2005 | Kornblit et al. | |
| 2005/0162049 A1 | 7/2005 | Krill | |
| 2006/0122565 A1* | 6/2006 | Kooi ............................ | 604/246 |
| 2006/0158065 A1 | 7/2006 | Pelrine et al. | |
| 2007/0237937 A1 | 10/2007 | Aizenberg et al. | |
| 2008/0072357 A1 | 3/2008 | Aizenberg et al. | |

FOREIGN PATENT DOCUMENTS

JP 2005304212 A * 10/2005

OTHER PUBLICATIONS

D.J. Beebe et al., Functional Hydrogel Structures for Autonomous Flow Control Inside Microfluidic Channels, 404 Nature 588-590 (2000).*
A.K. Agarwal et al., Programmable Autonomous Micromixers and Micropumps, 14 J. Microelectromech. Syst. 1409-1421 (2005).*
Definition for "support" available at http://dictionary.reference.com/browse/support (2009).*
U.S. Appl. No. 11/227,759 filed Sep. 15, 2005 entitled "Fluid Oscillations on Structured Surfaces" to Aizenberg, et al.
U.S. Appl. No. 11/227,808, filed Sep. 15, 2005 entitled "Heat-Induced Transitions on a Structured Surface" to Aizenberg, et al.

* cited by examiner

*Primary Examiner* — Glenn Caldarola
*Assistant Examiner* — Randy Boyer
(74) *Attorney, Agent, or Firm* — Hitt Gaines, PC

(57) ABSTRACT

An apparatus comprising a substrate having a surface with a volume-tunable-material on the surface and fluid-support-structures over the surface and partially embedded in the volume-tunable-material. Each of said fluid-support-structures has at least one dimension of about 1 millimeter or less, and the fluid-support-structures are moveable in response to a volume transition of the volume-tunable-material.

20 Claims, 13 Drawing Sheets

ENVIRONMENTALLY SENSITIVE NANOSTRUCTURED SURFACES

TECHNICAL FIELD OF THE INVENTION

The invention relates generally to an apparatus having structured surfaces and methods of making and using such an apparatus.

BACKGROUND OF THE INVENTION

There is great interest in producing surfaces whose wettability can be controlled. The ability to control the wettability of a surface allows one to change the extent to which a fluid wets the surface or is repelled from the surface. Moreover, it would be advantageous to dynamically control the wettability of a surface based upon changes in the environment that the surface is exposed to. It would also be advantageous if such changes could be made with a minimum of energy expenditure. Unfortunately, existing surfaces do not provide the desired control of wettability.

For instance, certain surfaces with raised features, such as posts or pins, may provide a superhydrophobics surface. That is, a droplet of liquid on a superhydrophobic surface will appear as a suspended drop having a contact angle of at least about 140 degrees. Applying a voltage between the surface and the droplet can cause the surface to become wetted, as indicated by the suspended drop having a contact angle of less than 90 degrees. This is further discussed in U.S. patent applications Ser. Nos. 10/649,285 and 10/403,159, which are incorporated by reference herein in their entirety. In some cases, additional energy needs to be added to de-wet the surface. Examples of introducing energy to de-wet a surface by heating the surface are presented in U.S. patent application Ser. Nos. 11/227,759 and 11/227,808, which are incorporated by reference herein in their entirety.

Although the wettability of such surfaces can be controlled through the application of a voltage, they require a power source to heat or provide the voltage to the surface. Additionally, if the objective is to dynamically change wettability upon changes in the environment, then an environmental sensor and a means for deciding when to apply the voltage or heat would also have to be provided.

SUMMARY OF THE INVENTION

To address one or more of the above-discussed deficiencies, one embodiment is an apparatus. The apparatus comprises a substrate having a surface. A volume-tunable-material is on the surface and fluid-support-structures are over the surface. The fluid-support-structures are partially embedded in the volume-tunable-material. Additionally, each of the fluid-support-structures has at least one dimension of about 1 millimeter or less, and the fluid-support-structures are moveable in response to a volume transition of the volume-tunable-material.

Another embodiment is a method that comprises adjusting the wettability of a substrate surface by moving the above-described fluid-support-structures in response to a volume transition of the volume-tunable-material.

Yet another embodiment is a method that comprises locating the above-described fluid-support-structures over a substrate surface and forming the volume-tunable-material on the substrate surface and in contact with the fluid-support-structures.

BRIEF DESCRIPTION OF THE DRAWINGS

The various embodiments can be understood from the following detailed description, when read with the accompanying figures. Various features may not be drawn to scale and may be arbitrarily increased or reduced in size for clarity of discussion. Reference is now made to the following descriptions taken in conjunction with the accompanying drawings, in which.

DETAILED DESCRIPTION

Embodiments of the present invention benefit from the recognition that the wettability of a surface can be controlled by moving fluid-support-structures that are located over the surface. The fluid-support-structures are moved by physical transitions in a volume-tunable-material coupled to the fluid-support-structures. The volume of the material undergoes a transition in response to a change in the environment around the material. The movement of the fluid-support-structures in response to the volume transition changes the wettability of the surface. Consequently, changes in the wettability of the surface can be coupled to environmental changes. Changing the wettability advantageously does not require the introduction of extraneous energy, for example, to electro-wet or heat the surface.

Each fluid-support-structure can be a nanostructure or microstructure. The term nanostructure as used herein refers to a predefined raised feature on a surface that has at least one dimension that is about 1 micron or less. The term microstructure as used herein refers to a predefined raised feature on a surface that has at least one dimension that is about 1 millimeter or less. The term fluid as used herein refers to any liquid that is locatable on the fluid-support-structure.

The term wettability refers to the degree to which a fluid will spread on a surface. Wettability can be quantified by determining the contact angle of the fluid on the surface. A non-wettable or superhydrophobic surface refers to a surface having fluid-support-structures that can support a droplet of fluid thereon such that the droplet has a contact angle of at least about 140 degrees. A wettable or hydrophilic surface, as used herein, refers to a surface having fluid-support-structures that can support a droplet of fluid thereon such that the droplet has a contact angle of about 90 degrees or less.

Figure 1:
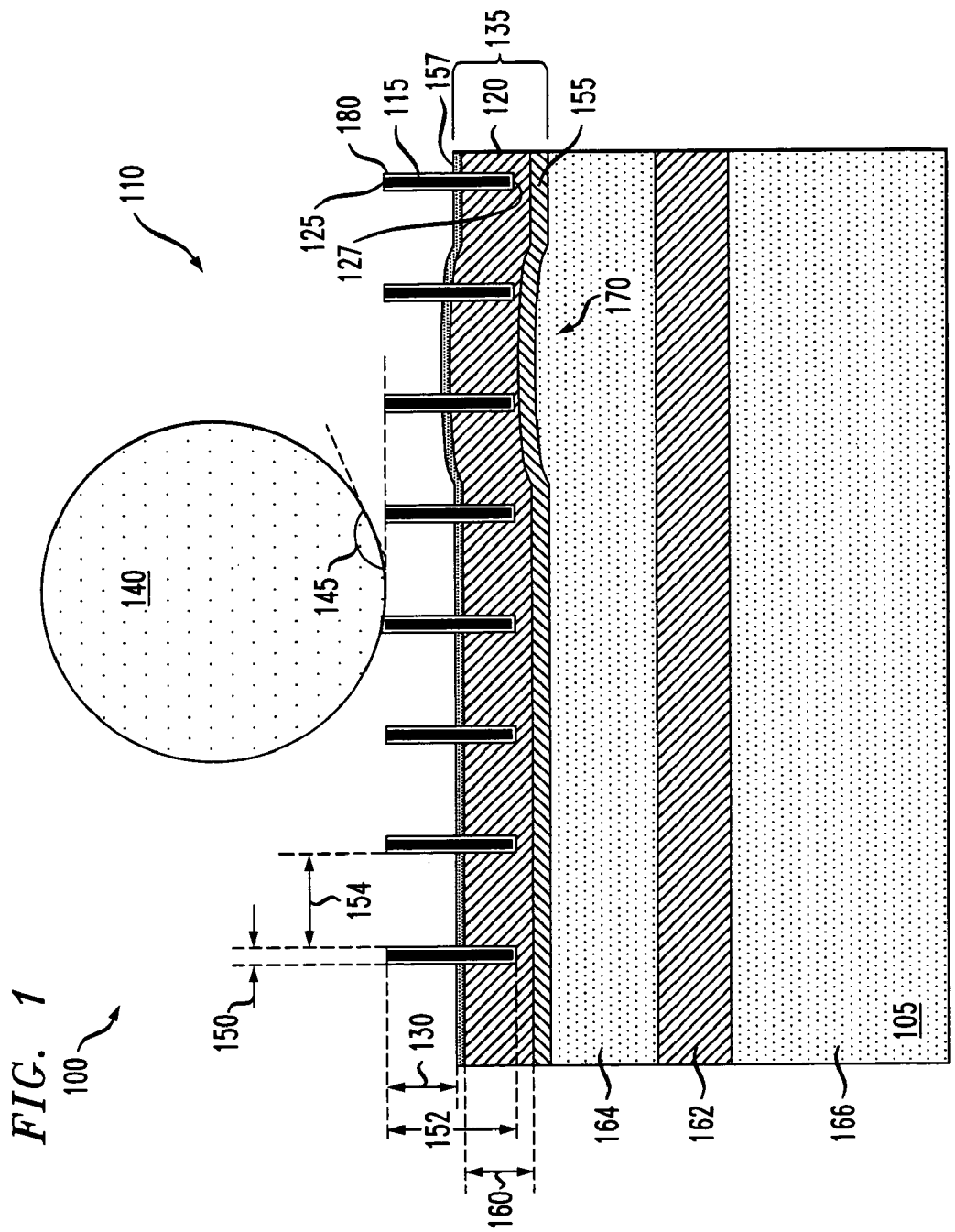
FIG. 1 presents a cross-sectional view of an exemplary apparatus having a volume-tunable-material in an expanded state.

One embodiment is an apparatus. FIG. 1 presents a cross-sectional view of an exemplary embodiment of an apparatus 100. The apparatus 100 comprises a substrate 105 having a surface 110. Fluid-support-structures 115 are over and a volume-tunable-material 120 is on the surface 110. The fluid-support-structures 115 are partially embedded in the volume-tunable-material 120. Moreover, the fluid-support-structures 115 are moveable in response to a volume transition of the volume-tunable-material 120.

The term partially embedded, as used herein, means that, when the volume-tunable-material is in an expanded state, at least the tops 125 (the surface that is most distal to the substrate surface) of the fluid-support-structures 115 protrude out from the volume-tunable-material 120 and at least the bottoms 127 (the surface most proximal the substrate surface) are surrounded by the volume-tunable-material 120. In certain preferred embodiments, the tops 125 protrude out from the volume-tunable-material 120 even when the volume-tunable-material 120 is at its maximum expanded state (e.g., maximum volume).

Under some environmental conditions, such as illustrated in FIG. 1, the tops 125 of the fluid-support-structures 115 protrude such that a distance 130 between the tops 125 and a base layer 135 of the substrate 105 is sufficient to support a fluid 140 locatable on the tops 125. As illustrated in FIG. 1, the base layer 135 on the substrate 105 can comprise the volume-tunable-material 120.

Consider when, for example, the fluid-support-structures 115 comprise posts having a lateral width 150 of about 0.2 to 0.5 microns, height 152 of about 5 to 100 microns and a lateral separation 154 of about 1 to about 20 microns. To support a fluid 140 on the tops 125 of the fluid-support-structures 115, the distance 130 is preferably at least 5 microns. Under these conditions, when the fluid 140 locatable on the surface 110 has a contact angle 145 of at least about 140 degrees, the surface 110 is defined as superhydrophobic or non-wettable. The above-cited dimensions of the fluid-support-structures 115 and their separation are useful in cases where the fluid 140 is an aqueous fluid. One skilled in the art would understand, however, that the dimensions of and separation between the fluid-support-structures 115 could be adjusted to support other types of fluids, e.g., non-aqueous fluids in a similar fashion.

Figure 2:
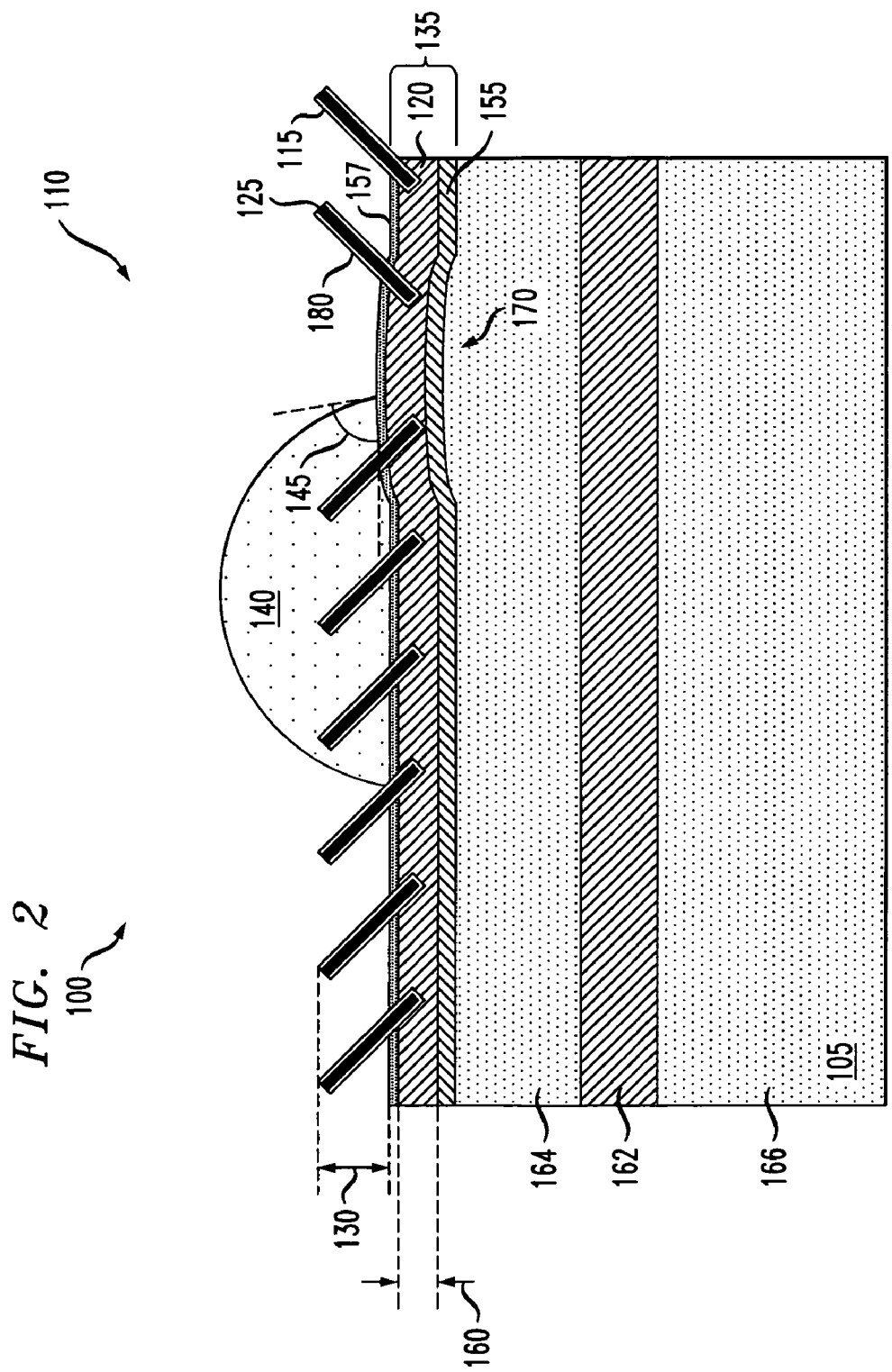
FIG. 2 shows a cross-sectional view of the same apparatus depicted in FIG. 1, but with the volume-tunable-material in a shrunken state.

FIG. 2 presents a cross-sectional view of the same apparatus 100 depicted in FIG. 1, but under conditions when the volume-tunable-material 120 is in a contracted or shrunken state. That is, the volume of the volume-tunable-material 120 is less than in the state shown in FIG. 1. In some cases, for example, the thickness 160 of the volume-tunable-material 120 when in a contracted or shrunken state is at least about 10 percent less than the thickness 160 of the volume-tunable-material 120 when in an expanded state (e.g., FIG. 1).

Under conditions such as shown in FIG. 2, the distance 130 between the tops 125 and a base layer 135 of the substrate 105 is insufficient to support the fluid 140 locatable on the tops 125 of the fluid-support-structures 115. That is, the decrease in volume of the volume-tunable-material 120 causes the distance 130 to decrease below the minimum needed to support the fluid 140 on the tops 125. Continuing with the above example of an aqueous fluid 140, when the volume-tunable-material 120 is in a contracted or shrunken state, the distance 130 is less than about 5 microns. Under these conditions, when the fluid 140 locatable on the surface 110 has a contact angle 145 of about 90 degrees or less, the surface 110 is defined as hydrophilic or wettable.

The movement of the fluid-support-structures 115, as illustrated in FIGS. 1 and 2, causes a change in a wettability of the substrate's surface 110. In some cases, a volume transition causes a change in the contact angle 145 of the fluid droplet 140 locatable on the surface 110 by at least 20 degrees, and more preferably at least about 50 degrees.

The volume-tunable-material 120 can comprise any material whose volume can change in response to an environmental stimulus, that is, a chemical or a physical change in the environment around the material. In some embodiments, the volume-tunable-material 120 comprises a polymer. Examples of suitable polymers include hydrogels such as polyacrylamide. Exemplary hydrogels include cross-linked polymers of acrylamides such as N-isopropylacrylamide, N,N'-methylenebisacrylamide; cross-linked polymers of tetraethylene glycol dimethacrylate; and/or cross-linked co-polymers such as hydroxyethyl methacrylate-co-methacrylic acid and/or acrylamide-co-2-vinylpyridine.

One of ordinary skill in the art would understand how the composition of the material 120 could be adjusted to exhibit the desired magnitude of volume transition in response to an environmental stimulus. However, the volume-tunable-material 120 also needs to be configured to prevent the undesired movement of the fluid-support-structure 115. That is, in some cases it is preferable that fluid-support-structure 115 move only when the material 120 undergoes a volume transition.

The extent of crosslinking of a polymer can be increased or decreased to reduce or enlarge the volume transition and at the same time provide a polymer that is rigid enough to hold the fluid-support-structures 115 in place in the volume-tunable-material 120, when there is no volume transition. As an example, the volume-tunable-material 120 can be made from an aqueous solution containing about 10 to 40 wt % of acrylamide, about 0.1 to 4 wt % of N,N'-methylenebisacrylamide as a crosslinker, and about 0.1 to 4 wt % of ammonium persulphate as a radical initiator.

In some cases, the volume-tunable-material 120 can form a layer that substantially covers the substrate surface 110. For example, as shown in FIGS. 1 and 2 the volume-tunable-material 120 comprises a layer of the base layer 135. However, in other embodiments, only a portion of the surface 110 need be covered with the volume-tunable-material 120. For example, local regions of the surface 110 may have the volume-tunable-material 120 thereover, such that the volume-tunable-material 120 surrounds individual ones or groups of the fluid-support-structures 115.

One of ordinary skill in the art would understand how to adjust the amount of the volume-tunable-material 120 on the substrate 105 and around fluid-support-structures 115 to provide the desired magnitude of volume transition in response to environmental stimuli. Consider again the above example, where the volume-tunable-material 120 comprises a polyacrylamide hydrogel. The amount of the material 120 dispensed on the surface 110 can be adjusted so that its vertical thickness 160, when in an expanded state (e.g., such as shown in FIG. 1), is less than the height 152 of the fluid-support-structures 115. In some cases, the vertical thickness 160 is at least about 5 microns less than the height 152 (e.g., the distance 130 is at least about 5 microns).

As noted above, the base layer 135 can comprise the volume-tunable-material 120. For example, the base layer 135 can include a layer of volume-tunable-material 120. In other cases, however, discrete portions of the volume-tunable-material 120 can be located round individual ones or groups of the fluid-support-structures 115 without forming a layer. In such instances, for example, portions of the substrate can be exposed to the surface 110.

The base layer 135 can also comprise an anchor layer 155. The anchor layer 155 can be bonded to the volume-tunable-material 120 and to the substrate 105. Additionally, the anchor layer 155 can facilitate the volume transition occurring in a dimension (e.g., vertical dimension for the view of the apparatus shown in FIGS. 1-2) that maximizes magnitude of change in the distance 130 between the tops 125 and a base layer 135. For example, an anchor layer 155 of poly(glycidyl-methacrylate) (PGMA) can be covalently bonded to a volume-tunable-material 120 of polyacrylamide hydrogel. Examples of forming a PGMA layer and coupling it to a polyacrylamide hydrogel layer are presented in U.S. patent application Ser. Nos. 10/773,120, and 11/239,973, which are incorporated by reference herein in their entirety.

In some embodiments, the base layer 135 further comprises a reactivity coating 157 that provides a selective chemical reactivity of the surface 110. For example, the reactivity coating 157 can comprise drugs, antibiotics, proteins or nucleic acid species that affect the biological activity of the free surface 110. As illustrated in FIGS. 1-2, the reactivity coating 157 can be formed on the volume-tunable-material 120.

In some cases, the volume transition is caused by a change in the moisture content of the volume-tunable-material 120. For example, the change in volume could be responsive to humidity changes in the environment surrounding the apparatus 100, and more specifically, around the volume-tunable-material 120. The absorption of moisture into the volume-tunable-material 120 can cause its volume to increase, e.g., the material 120 swells. The loss of moisture from the volume-tunable-material 120 can cause its volume to decrease, e.g., the material 120 shrinks or contracts.

Other environmental stimuli can cause the volume transition, or modulate a moisture-driven volume transition. As an example, the volume transition can be responsive to temperature changes, pH changes, dissolved ion concentration changes, and illumination level changes. Chemical species that cause or modulate volume transition can include organic solvents, hydronium and hydroxide ions, or selected metal ions such as copper (Cu), nickel (Ni), cobalt (Co), or palladium (Pd) ions.

For example, volume-tunable-material 120 comprising hydrogels such as N-isopropylacrylamide and N,N'-methylenebisacrylamide can swell by at least about five times as the temperature is lowered from above 32° C. to below 32° C. (e.g., a change in temperature of at least about 5° C.). Alternately, volume-tunable-material 120 can comprise hydrogels that swell and contract significantly in response to variations in the pH of a fluid 140 located next to the hydrogel. Examples of pH-sensitive hydrogels include polymers of hydroxyethyl methacrylate-co-methacrylic acid and tetraethylene glycol dimethacrylate. These polymers may swell substantially more under basic conditions than under acidic conditions. Alternately, some hydrogels can swell and contract significantly in response to changes of a metal ion concentration in a fluid 140 located next to the hydrogel, e.g., a variation in a Cu, Ni, Co, and Pd ion concentration. Examples of such metal ion-sensitive hydrogels include polymers of acrylamide-co-2-vinylpyridine and N,N'-methylenebisacrylamide.

As noted above, the fluid-support-structures 115 can comprise posts. The term post, as used herein, includes any structures having round, square, rectangular or other cross-sectional shapes. For example, the fluid-support-structures 115 depicted in FIGS. 1-2 are post-shaped, and more specifically, cylindrically-shaped posts. In this instance, the at least one dimension that is about 1 millimeter or less is the lateral width 150, making the fluid-support-structures 115 microstructures. In some embodiments, the lateral width 150 is about 1 micron or less, making fluid-support-structures 115 nanostructures. In other cases, however, the fluid-support-structures 115 can comprise on-edge planes. The on-edge planes can be flat or curved structures, so long as this structure is moveable in response to the volume transition of the volume-tunable-material 120. A plurality of fluid-support-structures 115 can be arranged as an ordered array or random pattern over the surface 110.

In some states of the apparatus 100, it is advantageous for the total area of the tops 125 of the fluid-support-structures 115 on the surface 110 to be substantially less (e.g., 10 percent or less and more preferably 1 percent or less) than the total area of the base layer 135 on the surface 110. For instance, a lower total surface area helps to keep the fluid 140 on the tops of the surface 110 when it is in a superhydrophobic or non-wettable state when the volume-tunable-material 120 is in an expanded state.

The fluid-support-structures 115 can be made of rigid or flexible materials. In some cases, the fluid-support-structures 115 comprise flexible plastics such as polyethylene or polysilicones like poly(dimethylsiloxane) (PDMS). In other cases, the fluid-support-structures 115 comprise rigid materials such as silicon or silicon oxide. Similar to the fluid-support-structures 115, the substrate 105 can be made of rigid or flexible material. In some embodiments, the substrate 105 and fluid-support-structures 115 are made of the same material. The fluid-support-structures 115 can be flexibly directly attached to the substrate 105. For example, the substrate 105 can be made of flexible material such as a plastic and the fluid-support-structures 115 are raised features extending from the substrate's 105 surface 110.

In other embodiments, however, the substrate 105 and fluid-support-structures 115 can be made of different materials and the fluid-support-structures 115 are physically separated from the substrate 105. For example, the substrate 105 can comprise a flexible material like poly(dimethylsiloxane) and the fluid-support-structures 115 can comprise a rigid material like silicon or electroplated metals such as copper (Cu), nickel (Ni), or cobalt (Co). Alternatively, both the substrate 105 and the fluid-support-structures 115 can both comprise the same flexible or rigid materials, but still not be directly attached to each other. For example, as illustrated in FIGS. 1-2, the fluid-support-structures 115 can be physically separated from the substrate 105 with portions of the volume-tunable-material 120 or anchor layer 155 between the fluid-support-structures 115 and the substrate 105.

In some cases, it is preferable that the fluid-support-structures 115 comprise a flexible or rigid polymer that does not swell or contract in the presence of moisture or other environmental stimulus. In other instances, however, the fluid-support-structures 115 comprise materials that expand or contract similar to that described herein for the volume-tunable-material 120. In such cases, the change in volume of the fluid-support-structures 115, in cooperation with the change in volume of the volume-tunable-material 120, causes a change in the wettability of the surface 110.

The substrate 105 can comprise a planar semiconductor substrate. In some preferred embodiments, such as illustrated in FIGS. 1 and 2, the substrate 105 comprises a silicon-on-insulator (SOI) wafer having an insulating layer 162 of silicon oxide and the upper and lower silicon layers 164, 166. Of course, in other embodiments, the substrate 105 can comprise a plurality of planar layers made of other types of conventional materials. In still other cases, when the substrate is flexible, flat, curved, or bent configurations are possible.

In some embodiments, it is desirable for the substrate 105 surface 110 to have localized non-planarities. For instance, the substrate 105 can have low aspect ratio non-planar structures (e.g., height to width ratio of less than 2:1), such as a hill 170, that can promote the movement of the fluid-support-structures 115 in a predefined direction. For example, as illustrated in FIG. 2, the fluid-support-structures 115 can tilt in a way that is perpendicular to the front of the curvature. That is, the fluid-support-structures 115 tilt away from the curve of the hill 170 when the volume-tunable-material 120 undergoes a volume transition, for example. Of course, the surface could have other types or combinations of localized non-planarities such as valleys, trenches, or ridges configured to move the fluid-support-structures 115 in other predefined directions.

The controlled movement of the fluid-support-structures 115 in predefined directions as described above is one way to locally adjust the volume-transition-induced change in the local wettability of the surface 110. In other cases, local adjustments to the changes in the wettability can be controlled by placing different types or amounts of the volume-tunable-material 120 in selected locations on the surface 110. Or, different sizes or types of fluid-support-structures 115 can be located in selected locations on the surface 110.

As further illustrated in FIGS. 1-2, the fluid-support-structures 115 can further comprise a coating 180 of low-surface-energy material that physically modifies its wettability properties. The term low-surface-energy material, as used herein, refers to a material having a surface energy of about 22 dyne/cm (about $22 \times 10^{-5}$ N/cm) or less. Those of ordinary skill in the art would be familiar with the methods to measure the surface energy of materials. The low-surface-energy material facilitates obtaining a high contact angle 145 when the fluid 140 is on the fluid-support-structures 115, when e.g., the volume-tunable-material 120 is in an expanded or swollen state.

In some instances, the coating 180 can comprise Cytop® (Asahi Glass Company, Limited Corp. Tokyo, Japan), a fluoropolymer that is both an electrical insulator and low-surface-energy material. Other examples of low-surface-energy materials include polystyrene, amorphous fluorocarbon polymers such as polytetrafluoroethylene, and polymers with low glass transition temperatures, e.g., polybutylmethacrylate.

Figure 3:
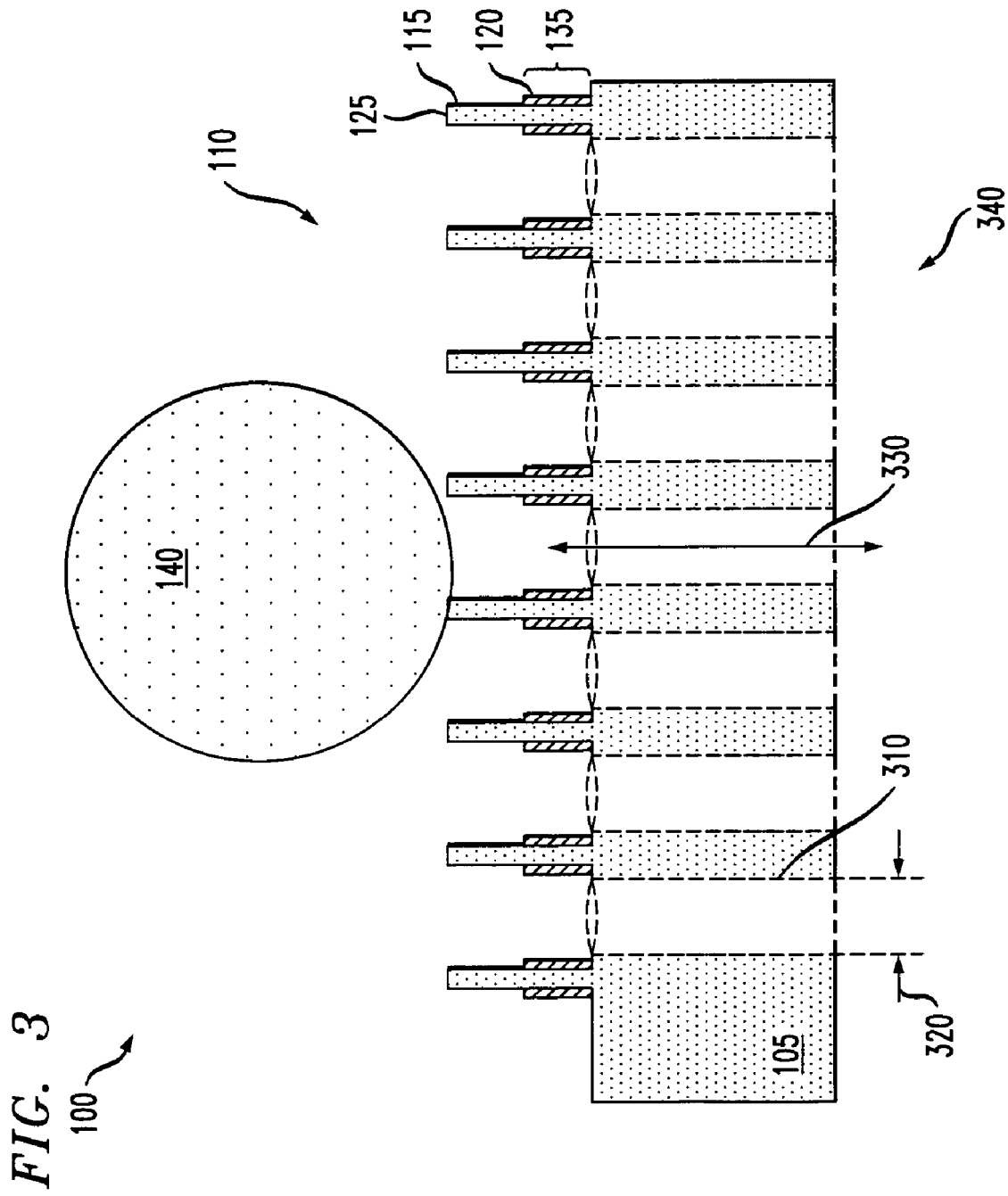
FIG. 3 presents perspective view of another exemplary apparatus having a volume-tunable-material in an expanded state.
Figure 4:
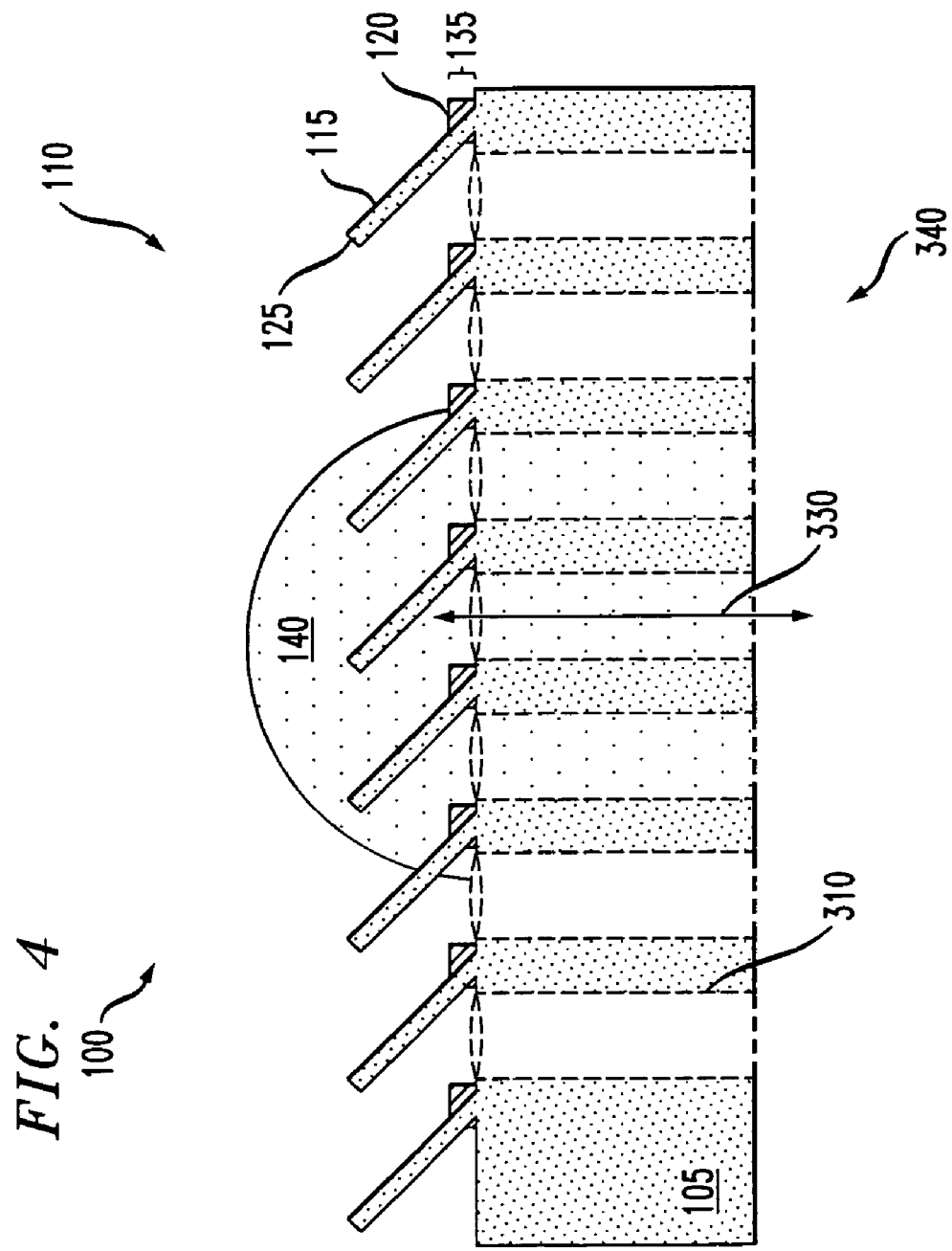
FIG. 4 shows a cross-sectional view of the same apparatus depicted in FIG. 3, but with the volume-tunable-material in a shrunken state.

FIGS. 3 and 4 show a cross-sectional view of another embodiment of the apparatus 300. The same reference numbers are used to depict similar structures in FIGS. 3 and 4 as presented above in context of FIGS. 1-2. For clarity, various optional components, such as the anchor layer, reactivity coating and low-surface-energy coating, already discussed in the context or FIGS. 1-2, are not depicted. FIGS. 3 and 4 show the apparatus 300 when the volume-tunable-material 120 is in one of an expanded or contracted state, causing the surface 110 to be superhydrophobic or hydrophilic, respectively.

As further illustrated in FIGS. 3 and 4, the fluid-support-structures 115 can be flexibly directly attached to the substrate 105. For instance, the fluid-support-structures 115 and the substrate 105 can both comprise the same flexible plastic. For the depicted apparatus 300, the volume-tunable-material 120 surrounds the lower portions of individual ones of the fluid-support-structures 115.

As further illustrated in FIGS. 3 and 4, the substrate 105 further comprises a porous membrane. In some embodiments, for example, the substrate 105 can have microporous openings 310 with diameters 320 of e.g., about 1 mm or less. The microporous openings 310 can advantageously provide a path 330 to allow fluid moisture 140 to circulate between the surface 110 having the fluid-support-structures 115 and another substrate surface 340 not having fluid-support-structures 115 thereover. For example, the apparatus 300 can be configured to repel moisture from the surface 110 when exposed to a wet environment, and to allow moisture to travel through the microporous openings 310 when the surface 110 is exposed to a dry environment.

Some embodiments of the apparatuses, such as illustrated in FIGS. 1-4, comprise devices for analyzing biological fluids such as a mobile diagnostic device like a lab-on-chip device. Other embodiments of the apparatus comprise wearable articles such as clothing, bandages, wound dressings, or artificial skin. As an example, for the apparatus 300 depicted in FIG. 3, the substrate 105 can be incorporated into a wearable article. For instance, the substrate 105 can be incorporated such that the surface 110 faces a moist environment. For example, when the wearable article is an article of clothing such as a raincoat, the substrate 105 can be positioned such that the surface 110 faces the exterior of clothing. For example, when the wearable article is a bandage, wound dressing, or artificial skin, the substrate 105 can be positioned such that the surface 110 faces the interior of the article (e.g., facing the wearer's skin, or more specifically, a cut or wound site in the skin).

Another embodiment is a method of use that includes adjusting the wettability of a substrate surface. FIGS. 1-4 present cross-section views of the exemplary apparatuses 100, 300 at various stages of a method. Any of the various embodiments of the apparatus discussed above and illustrated in FIGS. 1-4 could be used in the method. As discussed previously, the fluid-support-structures 115 are partially embedded in the volume-tunable-material 120, and at least one dimension of the fluid-support-structures 115 is about 1 millimeter or less.

FIGS. 1 and 3 show the representative apparatuses 100, 300 when the volume-tunable-material 120 is in an expanded state. The wettability of a substrate's 105 surface 110 can be adjusted by moving the fluid-support-structures 115 located over the surface 110 in response to a volume transition of the volume-tunable-material 120 located on the surface 110. As shown in FIG. 1, moving the fluid-support-structures 115 can cause an increased distance 130 between the tops 125 and the base layer 135 when the volume decreases.

FIGS. 2 and 4 show the representative apparatuses 100, 300 when the volume-tunable-material 120 is in a contracted state. As shown in FIG. 2, moving the fluid-support-structures 115 can cause a decreased distance 130 between tops 125 of the fluid-support-structures 115 and a base layer 135 of the surface 110 when a volume of the volume-tunable-material 120 decreases. As also discussed above, the volume transition of the volume-tunable-material 120 is caused by a change in an environmental condition in contact with said volume-tunable-material. Examples include changes in the humidity level, temperature, concentration of an ion in a fluid located on the surface 110 or an illumination level of the environment.

In some preferred embodiments the movement of the fluid-support-structures 115, such as depicted in FIGS. 1 and 2 or FIG. 3 and 4, is reversible. In such cases, therefore, the wettability of the surface 110 can be reversibly adjusted. However, the method also includes instances where the movement of the fluid-support-structures 115 is not reversible.

Still another embodiment is a method of manufacturing an apparatus. The method comprises locating fluid-support-structures located over a substrate surface and forming a volume-tunable-material on the substrate surface and in contact with the fluid-support-structures. The fluid-support-structures are moveable in response to a volume transition of the volume-tunable-material. Each of the fluid-support-structures has at least one dimension of about 1 millimeter or less. Any of the above-described embodiments of apparatuses can be manufactured by the method.

Figure 5:
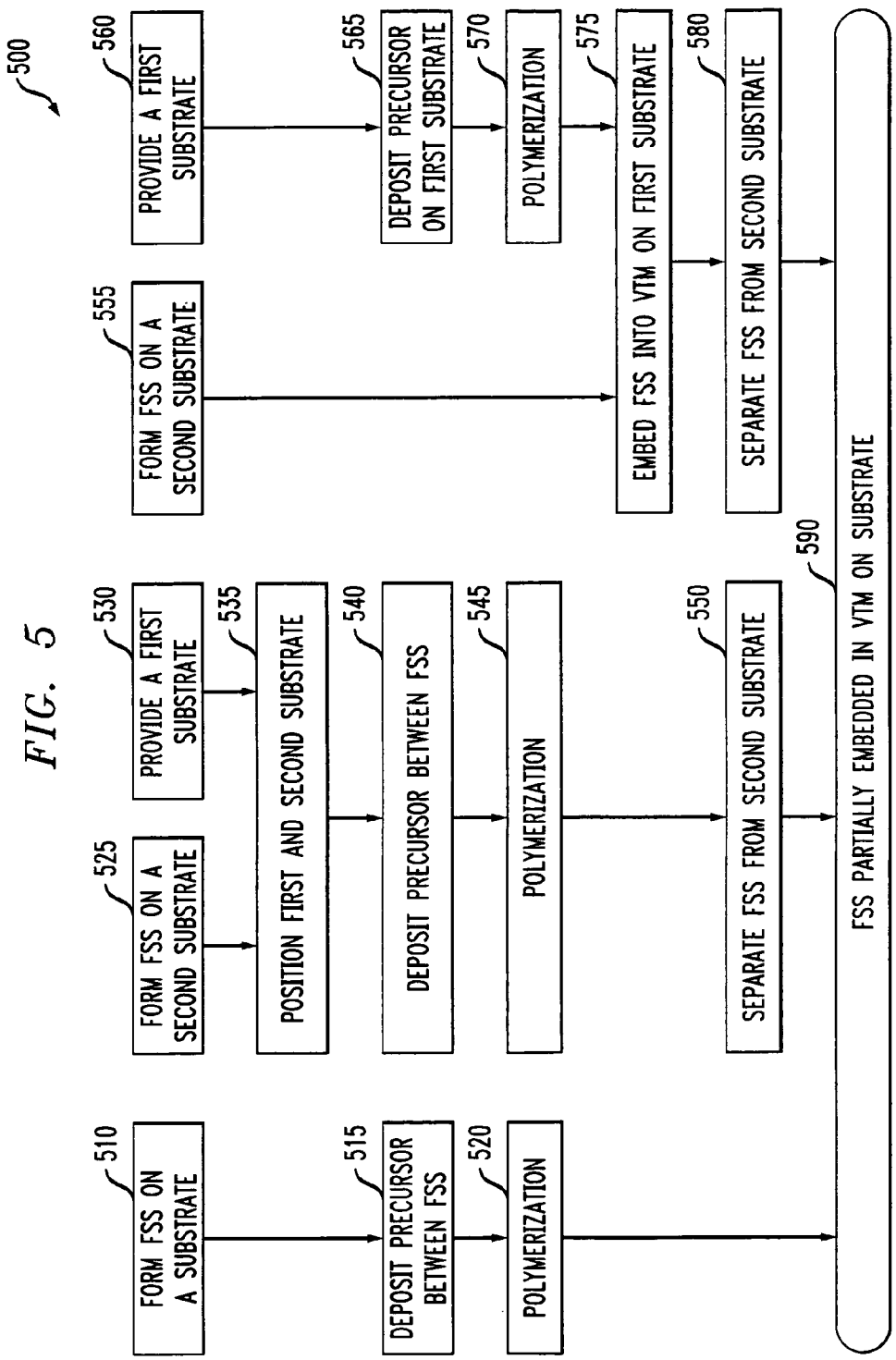
FIG. 5 presents a flow diagram of selected steps in exemplary methods of manufacture.

FIG. 5 presents a flow diagram showing the relationship between selected manufacturing steps used in three different embodiments of the method of manufacture. FIGS. 6-18 show cross-sectional views of exemplary apparatuses at various stages of construction. The same reference numbers are used to depict similar structures in FIGS. 6-18, as presented above in context of FIGS. 1-4.

Figure 6:
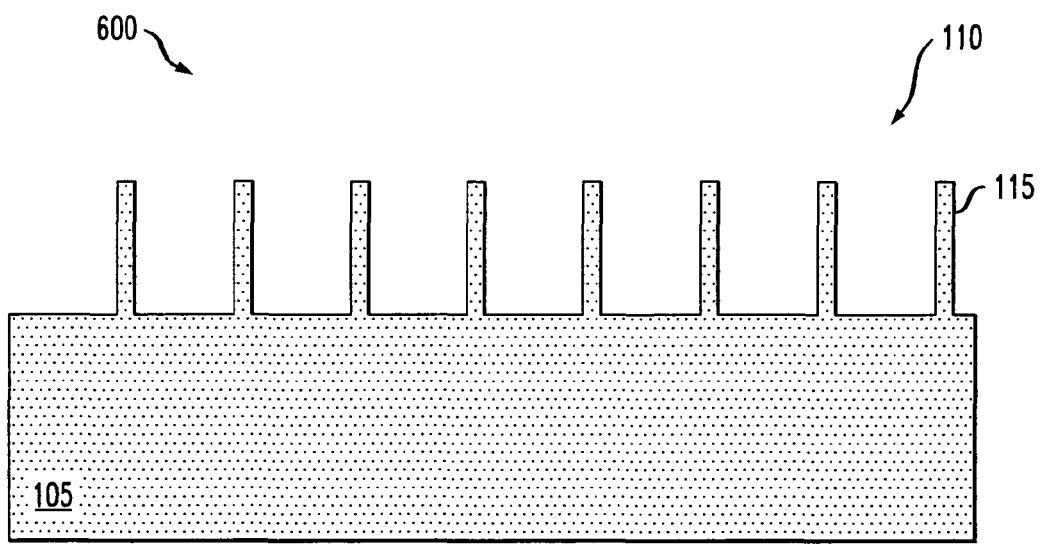
FIGS. 6-18 present cross-sectional views of exemplary apparatuses at selected stages of manufacture.

FIGS. 5 and 6-8 show selected steps in a first embodiment of the method. Referring to FIGS. 5 and 6, locating the fluidsupport-structures over a substrate surface can include a step 510 of forming the fluid-support-structures (abbreviated as "FSS" in FIG. 5) 115 on a substrate 105 of an apparatus 600. The fluid-support-structures 115 can be flexibly directly attached to the substrate 105. For example, template fluid-support-structures can be formed from a surface of a silicon or silicon-on-insulator substrate by conventional photolithographic and dry-etching procedures. The template fluid-support-structures can then be used for casting molds and forming replicas of the fluid-support-structures 115 on a surface 110 of the substrate 105, the replicas being made out of flexible polymeric materials such as plastics.

Figure 7:
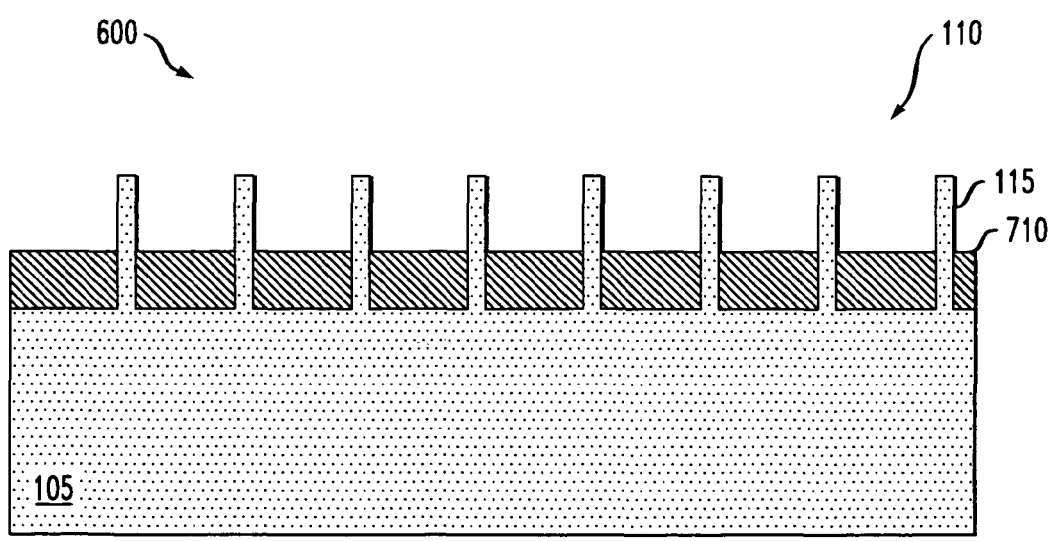

With reference to FIGS. 5 and 7, in this first embodiment, forming a volume-tunable-material (abbreviated as "VTS" in FIG. 5) on the substrate's surface 110 can include a step 515 of depositing a precursor 710 of the volume-tunable-material between the fluid-support-structures 115 formed in step 510. Depositing can include conventional methods such as dip or spin coating. When the volume-tunable-material is a polymer, the precursor 710 may comprise a solution containing monomers of the polymer and other ingredients to facilitate polymerization. For example, the precursor 710 can comprise an aqueous starting solution of about 40 wt % acrylamide monomers, about 0.5 wt % methylenebisacrylamide crosslinker molecules, about 0.5 wt % of a viscosity agent such as poly(acrylic acid), and about 1 to 4 wt % of free radical initiators such as ammonium persulfate.

Figure 8:
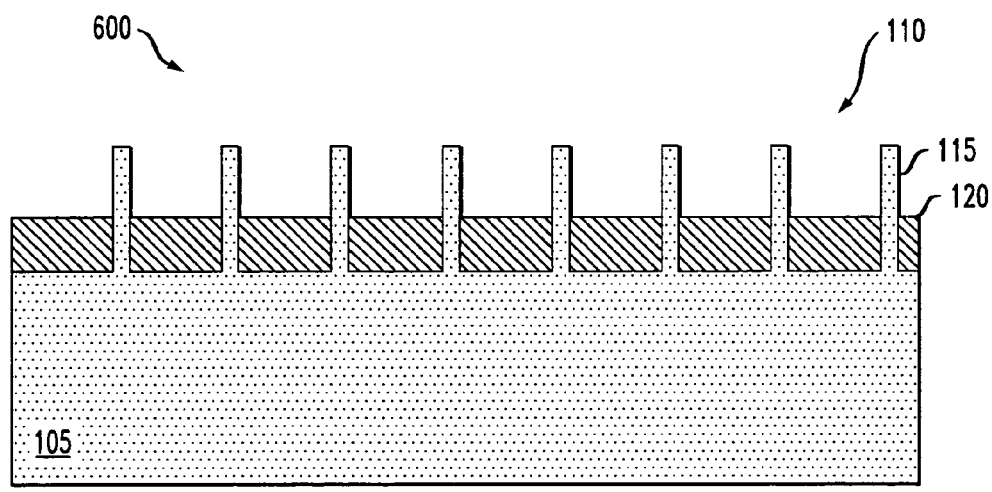

Referring to FIGS. 5 and 8, in this first embodiment, forming the volume-tunable-material 120 on the surface 110 can further include a polymerization step 520 to form the volume-tunable-material 120. Continuing with the example presented above in the context of step 515, polymerization can be facilitated by raising the temperature of the precursor solution that already contains the free radical initiators. For example, the polymerization reaction can be performed for about an hour at 50° C. Of course, the time for the polymerization reaction will vary with the desired thickness of the final hydrogel. The polymerization step 520 can include rinsing the volume-tunable-material 120 to remove unreacted monomers and cross-linker molecules from the apparatus 500.

Figure 9:
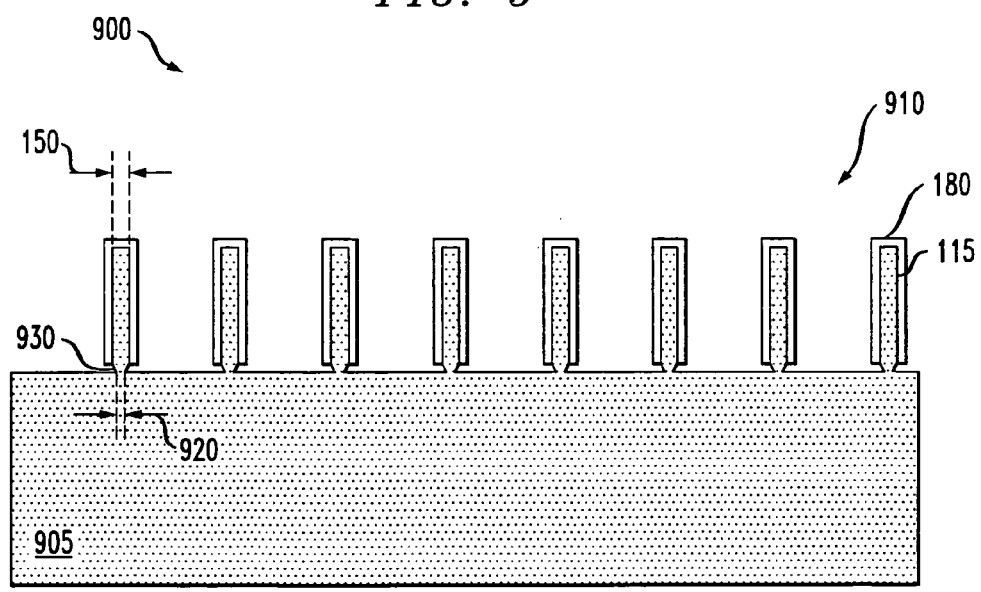

FIGS. 5 and 9-12 show selected steps in a second embodiment of the method. With reference to FIG. 5 and 9, locating the fluid-support-structures over a substrate surface of an apparatus 900 can include a step 525 of forming the fluid-support-structures 115 on a second substrate 905. Conventional photolithographic and dry-etching procedures, similar to that described in step 510, can be used to form rigid fluid-support-structures 115 on a surface 910 of the substrate 905. Alternatively, as discussed in the context of step 510, these structures could be used as templates for casting molds and forming replicas of the fluid-support-structures and substrate from polymeric materials.

In some cases, as illustrated in FIG. 9, it is advantageous to over-etch the fluid-support-structures 115 during their formation so that their thickness 920 proximate the substrate 905 is at least about 10 percent less than the thickness 150 in more distal portions of these structures 115. Over-etching can be accomplished using a deep reactive ion etch (DRIE) process such as the Bosch process, as presented in U.S. Pat. No. 5,501,893, which is incorporated by reference herein in its entirety. As illustrated in FIG. 9, the DRIE process can include depositing a coating 180 of low-surface-energy materials over the entire fluid-support-structures 115 except at their bottom 930, thereby allows over-etching to occur at this location.

Figure 10:
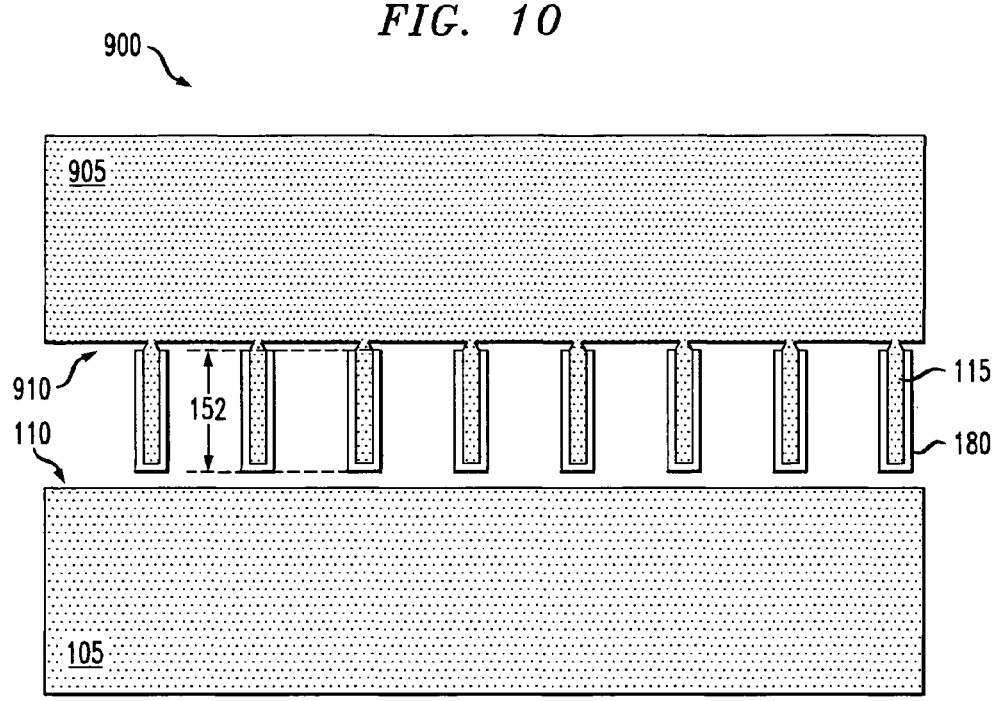

Referring to FIGS. 5 and 10, in the second embodiment, locating the fluid-support-structures over a substrate surface can further include a step 530 of providing the substrate 105, and a step 535 of positioning the substrate 105 and the second substrate 905 such that the substrate's 105 surface 110 and the second substrate's 905 surface 910 oppose each other. As illustrated in FIG. 10, the substrate's 105 surface 110 has no fluid-support-structures 115 physically attached to it. In such embodiments, the surface 105 and second substrate's surface 910 are advantageously uniformly separated by about a height 152 of the fluid-support-structures 115. As further illustrated in FIG. 10, it is desirable to arrange the two substrates 105, 905 such that the fluid-support-structures 115 are over, or rest on, the substrate's 105 surface 110.

Figure 11:
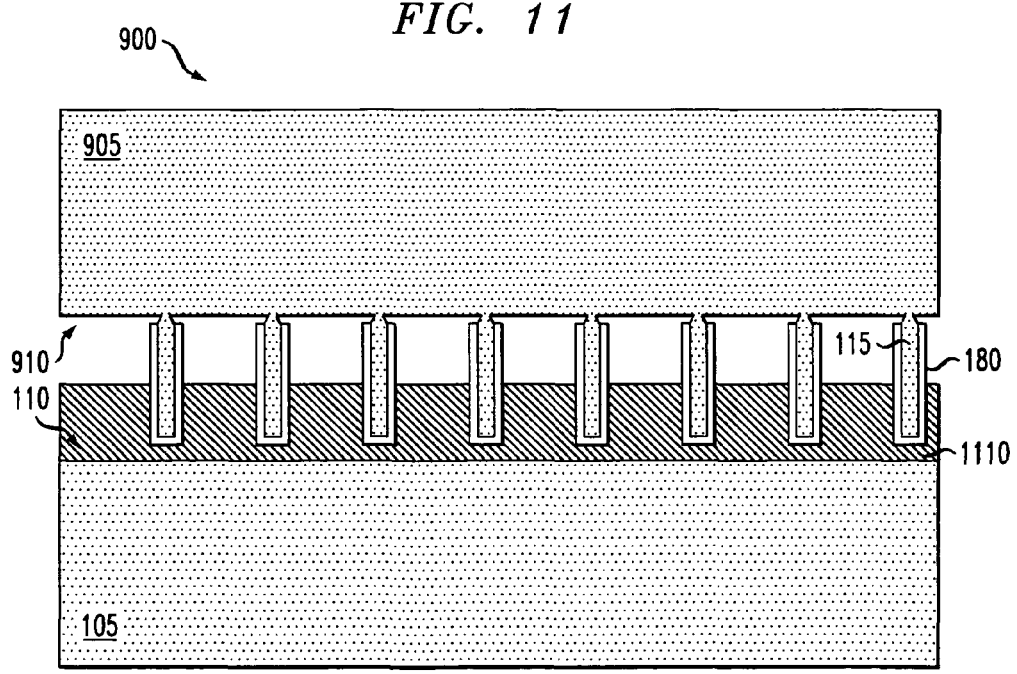

Referring to FIGS. 5 and 11, in the second embodiment, forming the volume-tunable-material on the substrate surface 110 comprises a step 540 of depositing a precursor 1110 of the volume-tunable-material between the fluid-support-structures 115 and on the surface 110. The deposition can be substantially the same as described above for step 515. In some cases, it is desirable to deposit the precursor 1110 on an anchor layer (not shown) that is on the surface 110, such as discussed above in the context of FIG. 1.

Figure 12:
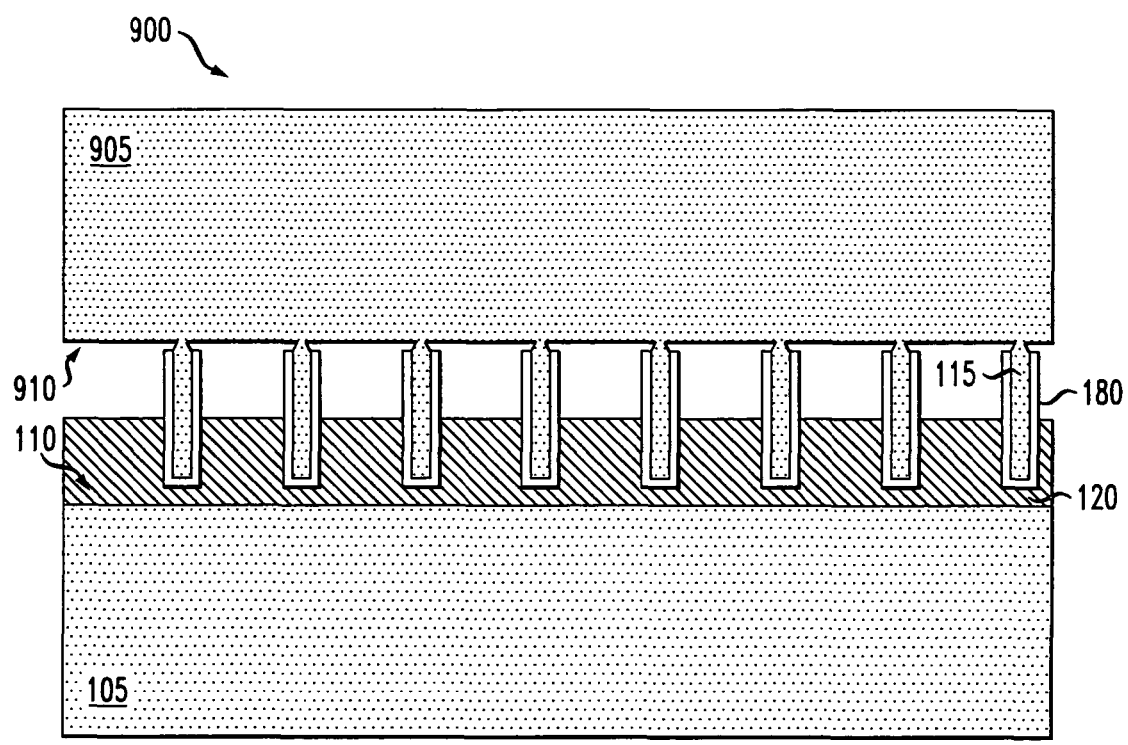

Referring to FIGS. 5 and 12, in the second embodiment, forming the volume-tunable-material on the substrate surface 110 can further include a polymerization step 545 to form the volume-tunable-material 120. The polymerization step 545 can be substantially the same as discussed about for step 520.

Figure 13:
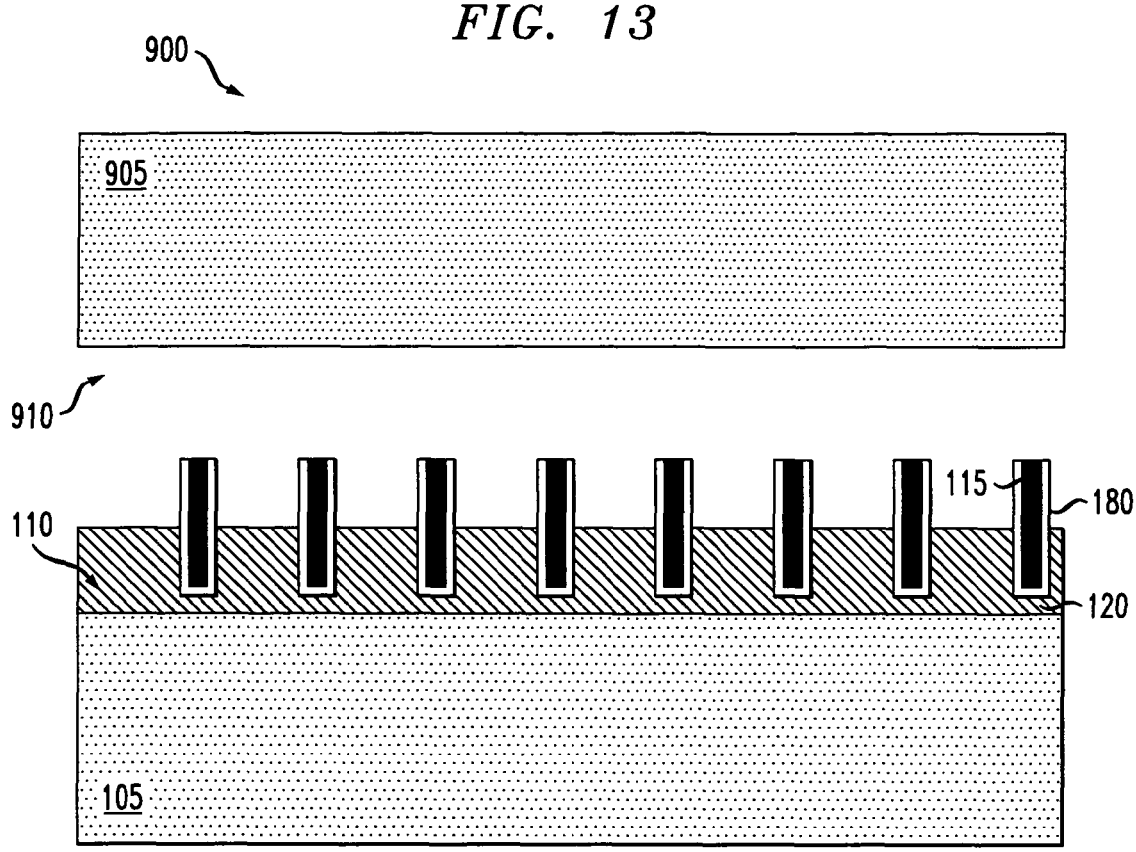

Referring to FIGS. 5 and 13, in the second embodiment, locating the fluid-support-structures over the substrate surface 110 can further include a step 550 of separating the fluid-support-structures 115 from the second substrate 905. In some preferred embodiments, separation can be achieved by applying a physical force, e.g., a lateral shearing force, to separate the fluid-support-structures 115 from the substrate 805. In some cases, over-etching the fluid-support-structures 115 as discussed in the context of FIG. 8 facilitates a planar physical separation at the bottoms 930 of fluid-support-structures 115. Alternatively, the separation can be achieved using conventional wet or dry etch procedures.

Figure 14:
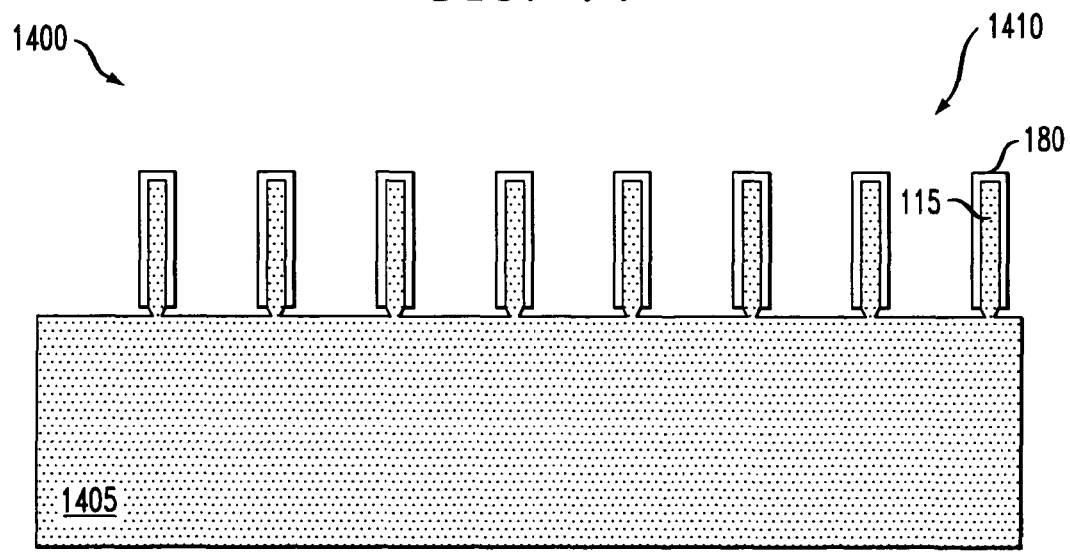

FIGS. 5 and 14-18 show selected steps in a third embodiment of the method. With reference to FIG. 5 and 14, locating the fluid-support-structures over the substrate surface, can include the step 555 of forming the fluid-support-structures 115 on a second substrate 1405. Forming the fluid-support-structures 115 on the surface 1410 of the second substrate 1405 can proceed substantially as described above in step 525.

Figure 15:
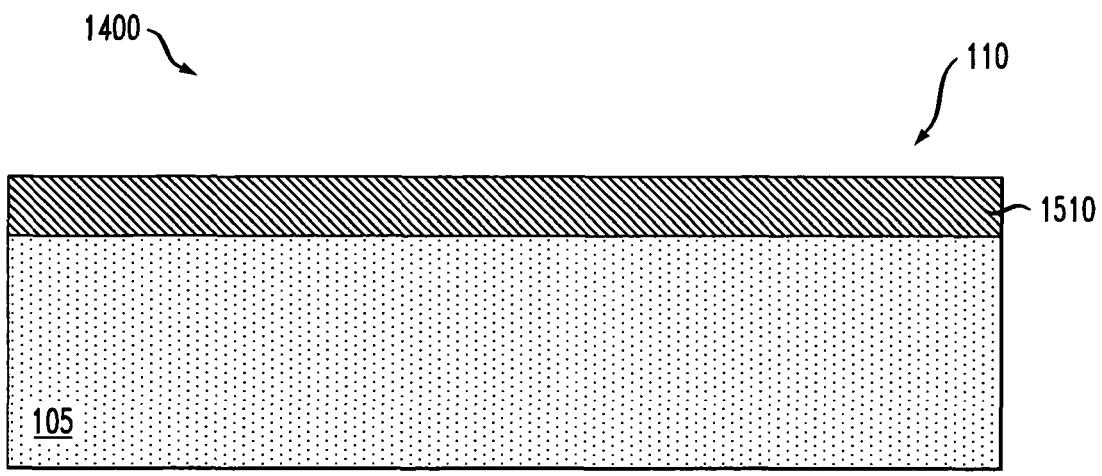

Referring to FIGS. 5 and 15, in this third embodiment, forming the volume-tunable-material 120 on the substrate surface 110 comprises a step 560 of providing the substrate 105 and step 565 of depositing a precursor 1510 on the substrate 105. The deposition can be substantially the same as described above for step 515. As illustrated in FIG. 15, the precursor 1510 is deposited on a surface 110, which is devoid of the fluid-support-structures.

Figure 16:
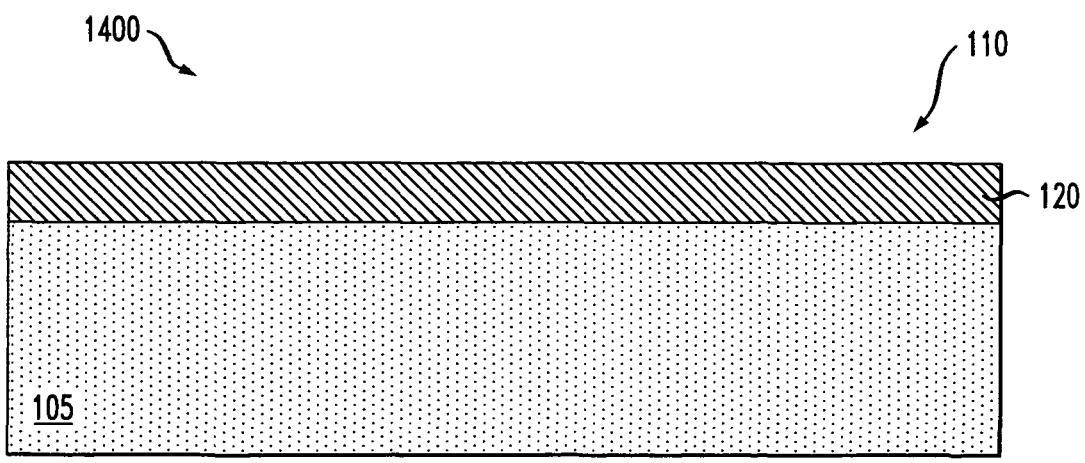

Referring to FIGS. 5 and 16, in the third embodiment, forming the volume-tunable-material 120 on the substrate surface 110 can further include a polymerization step 570. The polymerization step 570 can be substantially the same as discussed above for step 520.

Figure 17:
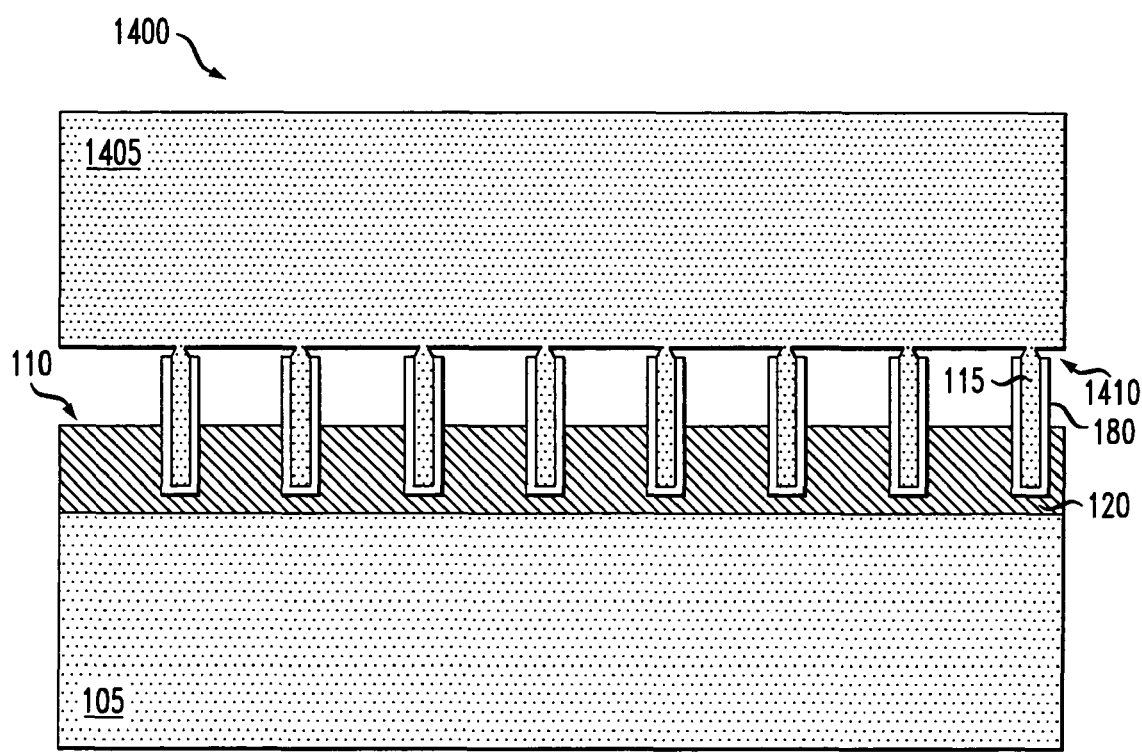

Referring to FIGS. 5 and 17, in the third embodiment, locating the fluid-support-structures over the substrate surface, can include the step 575 of embedding the fluid-support-structures 115 that are formed on the second substrate 1405 into the volume-tunable-material 120 that is formed on the substrate 105.

Figure 18:
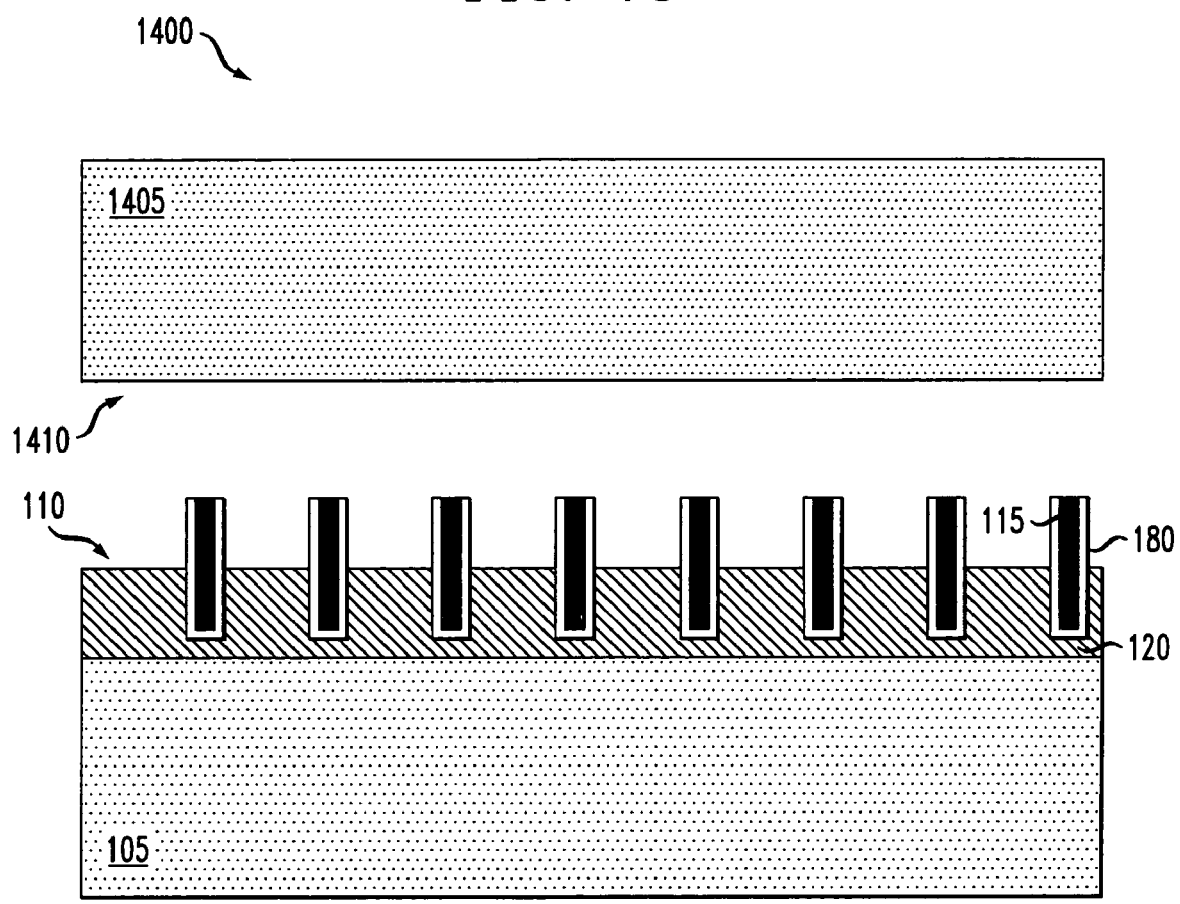

Referring to FIGS. 5 and 18, in the third embodiment, locating the fluid-support-structures over the substrate surface, can include a step 480 of separating the fluid-support-structures 115 from the second substrate 1405 (FIG. 16), using the substantially similar procedures as described for step 550.

Finally, as illustrated in FIG. 5, all three of the embodiments of the method can be terminated at a step 590, resulting in apparatuses such as illustrated in FIGS. 1-4, that have fluid-support-structures that are over the substrate and are partially embedded in a volume-tunable-material that is on the substrate.

Although the present invention has been described in detail, those of ordinary skill in the art should understand that they can make various changes, substitutions and alterations herein without departing from the scope of the invention.

What we claim is:

1. An apparatus, comprising:
a substrate having a surface
a volume-tunable-material on said surface; and
fluid-support-structures over said surface, each of said fluid-support-structures being partially embedded in said volume-tunable-material wherein
side portions of said fluid-support-structures contact said volume-tunable-material and tops of said fluid-support-structures protrude out of said volume-tunable-material,
each of said fluid-support-structures has at least one dimension of about 1 millimeter or less and
said fluid-support-structures are moveable in response to a volume transition of said volume-tunable-material.

2. The apparatus of claim 1, wherein said volume-tunable-material comprises a polymer.

3. The apparatus of claim 1, wherein said volume transition is caused by a change in moisture content of said volume-tunable-material.

4. The apparatus of claim 1, wherein said fluid-support-structures are configured to move such that a distance between tops of said fluid-support-structures and a base layer decreases when a volume of said volume-tunable-material decreases and increases when said volume increases.

5. The apparatus of claim 1, wherein said fluid-support-structures are configured to move such that a wetability of said surface is increased in response to a decreased volume of said volume-tunable-material.

6. The apparatus of claim 1, wherein said fluid-support-structures are flexibly attached to said substrate.

7. The apparatus of claim 1, wherein said fluid-support-structures are physically separated from said substrate.

8. The apparatus of claim 1, wherein said fluid-support-structures comprise one of posts or on-edge planes.

9. The apparatus of claim 1, wherein said volume transition is responsive to one or more of temperature changes, pH changes, dissolved ion concentration changes, and illumination level changes.

10. The apparatus of claim 1, wherein said substrate is incorporated into a wearable article.

11. A method, comprising:
adjusting the wettability of a substrate surface by moving fluid-support-structures located over said surface in response to a volume transition of a volume-tunable-material located on said surface, wherein
each of said fluid-support-structures has at least one dimension of about 1 millimeter or less and said fluid-support-structures are partially embedded in said volume-tunable-material, and
side portions of said fluid-support-structures contact said volume-tunable-material and tops of said fluid-support-structures protrude out of said volume-tunable-material.

12. The method of claim 11, wherein moving said fluid-support-structures cause a decreased distance between tops of said fluid-support-structures and a base layer of said surface when a volume of said volume-tunable-material decreases, and an increased distance between said tops and said base layer when said volume decreases.

13. The method of claim 11, wherein said volume transition is caused by a change in an environmental condition in contact with said volume-tunable-material.

14. The method of claim 13, wherein said changed environmental condition is one or more of a humidity level, temperature, concentration of an ion in a fluid located on said surface or an illumination level.

15. A method, comprising:
locating fluid-support-structures over a substrate surface; and
forming a volume-tunable-material on said substrate surface and in contact with said fluid-support-structures such that said fluid support structures are partially embedded in said volume-tunable material and side portions of said fluid-support-structures contact said volume-tunable-material and tops of said fluid-support-structures protrude out of said volume-tunable-material, wherein each of said fluid-support-structures has at least one dimension of about 1 millimeter or less and said fluid-support-structures are moveable in response to a volume transition of said volume-tunable-material.

16. The method of claim 15, wherein forming said volume-tunable-material comprises depositing a precursor of said volume-tunable-material between said fluid-support-structures.

17. The method of claim 15, wherein locating said fluid-support-structures includes forming said fluid-support-structures on said substrate.

18. The method of claim 15, wherein locating said fluid-support-structures includes forming said fluid-support-structures on a second substrate's surface.

19. The method of claim 18, wherein locating said fluid-support-structures further comprises positioning said substrate and said second substrate such that said surface and said second substrate's surface oppose each other, and forming said volume-tunable-material over said substrate surface comprises depositing a precursor of said volume-tunable-material between said fluid-support-structures.

20. The method of claim 15, wherein locating said fluid-support-structures includes partially embedding said fluid-support-structures, located on a second substrate, into said volume-tunable-material located on said substrate surface.

* * * * *